Feb. 21, 1928.
A. I. ADDISON
1,660,061
PIMENTO ROASTER
Filed March 7, 1927      2 Sheets-Sheet 1
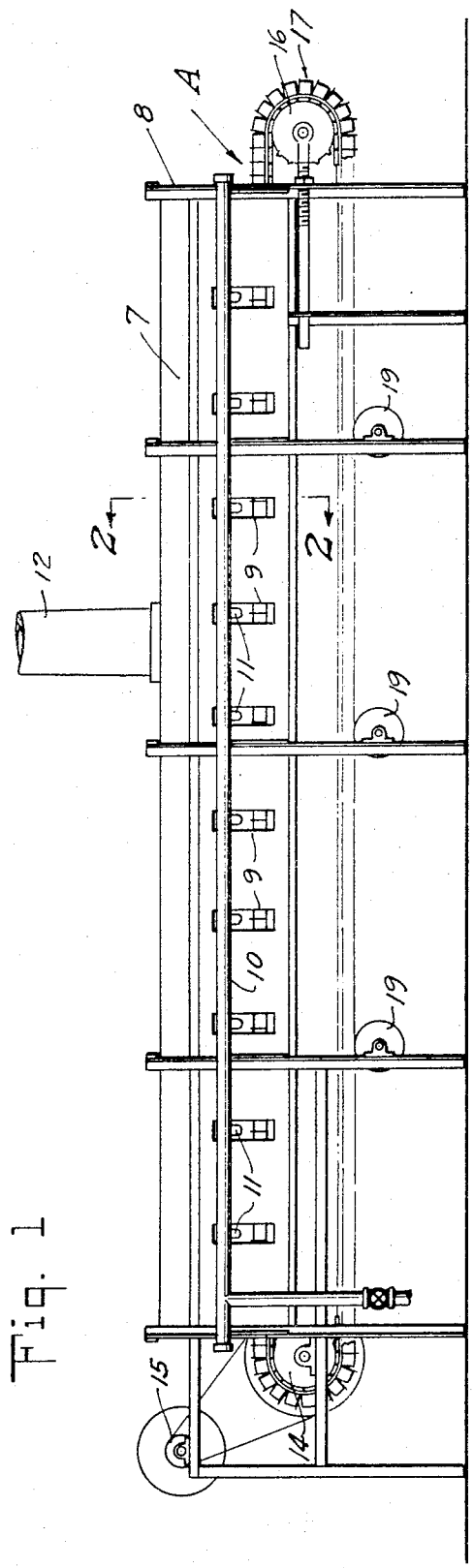
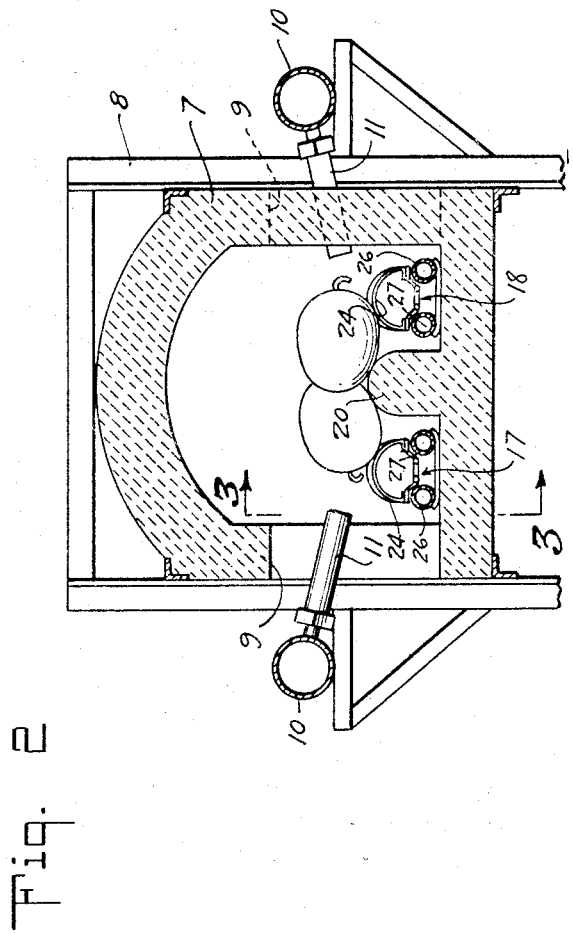
INVENTOR.
Amos Ivan Addison
BY Westall and Wallace
ATTORNEYS.

Feb. 21, 1928.
A. I. ADDISON
PIMENTO ROASTER
Filed March 7, 1927    2 Sheets-Sheet 2
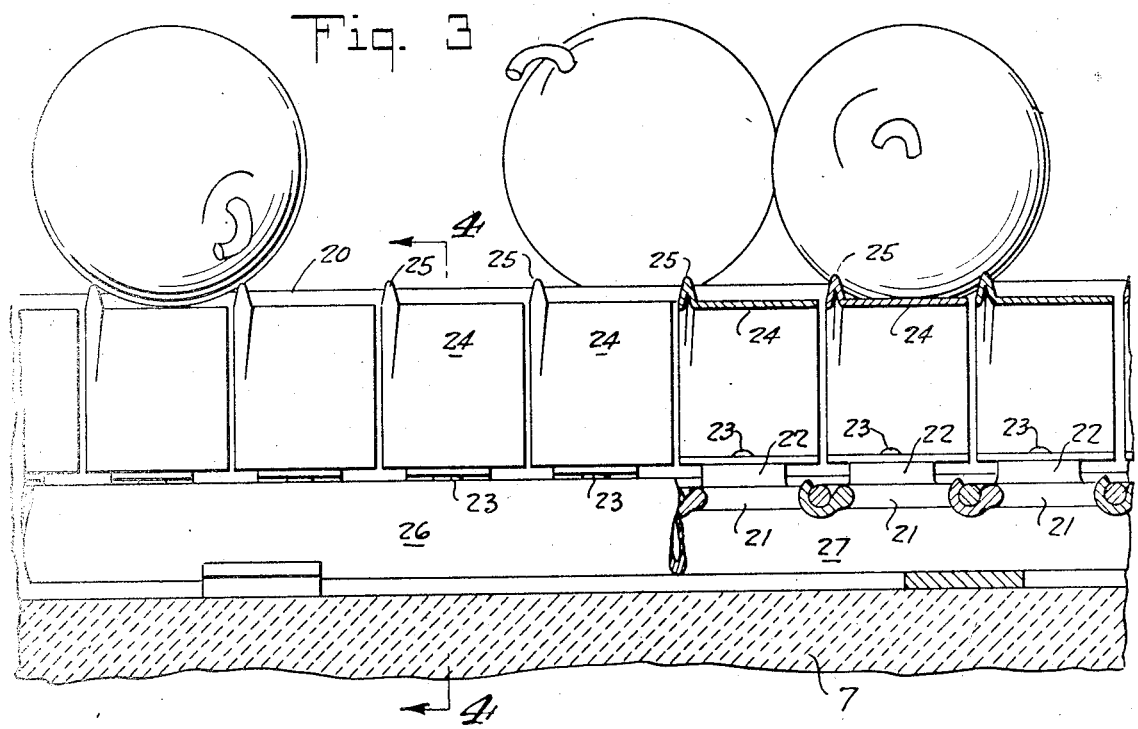
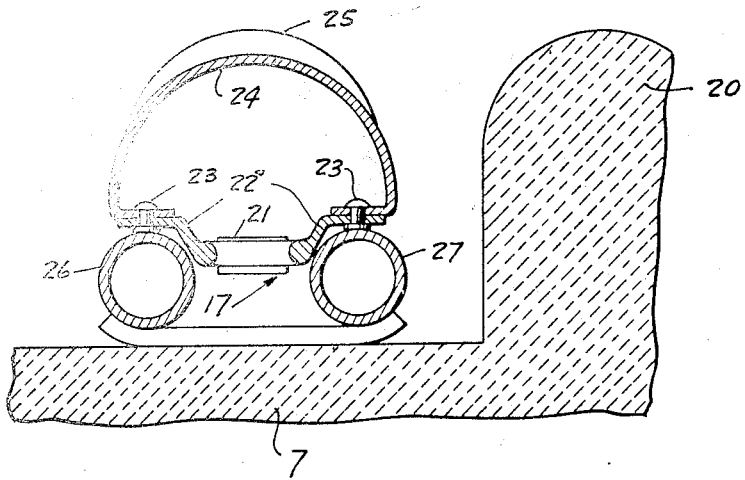
INVENTOR.
Amos Ivan Addison
BY Westall and Wallace
ATTORNEYS.

Patented Feb. 21, 1928.

1,660,061

UNITED STATES PATENT OFFICE.

AMOS IVAN ADDISON, OF LONG BEACH, CALIFORNIA, ASSIGNOR TO THE CURTIS CORPORATION, OF WILMINGTON, DELAWARE, A CORPORATION OF DELAWARE.

PIMENTO ROASTER.

Application filed March 7, 1927. Serial No. 173,593.

This invention relates to a roaster for pimentos or the like, wherein the substance under treatment is exposed directly to the open flame of the heating medium. In the preparation of pimentos for human consumption, it is desirable to remove the outer peel. One method heretofore employed comprises first softening the peel, usually by immersing the fruit in hot oil or caustic solution and then peeling it manually, which is a tedious process. Roasters have also been used wherein the skin of the fruit was seared and afterward removed.

It is a primary object of this invention to provide a roaster wherein the peel of pimentos or the like is burnt to a crisp or carbonized, so that it may be readily removed from the fruit by subjecting it to the washing action of jets of water. It is a further object of this invention to provide a roaster in which the fruit is given a continual turning movement while exposed to the flame, thus ensuring an even burning of the peel over the entire surface of the fruit and preventing damage by scorching the pulp in spots. In addition to the broader objects of this invention, there are certain details of construction whereby a simple, durable and economical structure is attained.

These objects are obtained by means of the embodiment of my invention illustrated in the accompanying drawing in which:

Fig. 1 is an elevation of a roaster constructed in accordance with my invention; Fig. 2 is a cross section of the roaster on an enlarged scale as seen on line 2—2 of Fig. 1; Fig. 3 is a fragmentary longitudinal section on an enlarged scale as seen on line 3—3 of Fig. 2, showing details of the carrier chain, and Fig. 4 is a cross-section of one of the carrier chains, as seen on line 4—4 of Fig. 3.

Referring more particularly to the drawing, the roaster comprises a tunnel-like oven structure 7 of fire brick or similar heat resisting material, supported and tied together with a suitable iron frame work 8. The oven is open at the ends and is provided with a series of openings 9 in its sides, those on one side being in staggered relation to those on the other. Extending longitudinally along each side of the oven and supported on suitable brackets secured to the frame work are gas pipes 10 to which are connected burners 11 projecting inwardly through the openings in the side walls of the oven. A chimney 12 is mounted on the oven roof to carry off the products of combustion. Mounted in bearings on one end of the frame work 8 is a shaft carrying a pair of sprocket wheels 14 and arranged to be driven by a countershaft 15. A shaft and similar sprocket wheels 16 are supported at the opposite end of the oven, adjustment means to move the shaft in a horizontal direction and take the slack out of the chain being provided. A pair of chains 17 and 18 are mounted on these sprockets, the upper reach of the chains moving through the oven, and the lower reach being carried beneath it on suitable idlers 19. Between the chains within the oven is parapet wall or curb 20, of the same material as the oven, having a rounded top for a purpose later described.

As the chains are identical, only one will be described. It consists of a number of links 21 pivotally secured together, each link having outstanding arms 22 on either side, to which is secured, as by rivets 23, a semi-circular shell 24 preferably of sheet metal and having an upstanding lip 25 at one end. Supported on the floor of the oven and secured together in spaced relationship are pipes 26 a..d 27. These support the chain which slides thereon on the heads of rivets 23, the sides of the links 21 serving to hold it in place laterally. The wear incident to the sliding of the chain through the oven on the pipes is taken by these rivets, which may be easily replaced when necessary. These pipes are provided with suitable connections, not shown, whereby a circulation of water may be maintained through them.

The operation of the roaster is as follows:

The gas from the burners having been ignited and the chains being in motion, the fruit which it is desired to roast is fed to the chain at the end of the roaster in a sufficiently small quantity so that it will form only a single layer thereon with some space between the individual pieces. These lie partly on the shells 24 of one or the other chains and partly on the wall 20, as clearly shown in Fig. 2. As the chains advance, the lips 25 move the fruit along with them into the oven where it is exposed to the flame issuing from the burners 11. The fruit, being substantially spheroidal in shape and by reason of resting partly on the moving chain and partly on the stationary wall, is rolled or turned in various directions as it advances, thus continually exposing fresh parts of the surface to the action of the flame. This insures complete and uniform carbonization of the peel over the entire surface of the fruit and prevents scorching of the fruit in spots. The fruit after being conveyed through the oven is discharged at the opposite end from that which it entered, where it may be removed from the chains by hand or other suitable means. It is then ready for further treatment.

It is obvious that the portion of the chains within the oven will be subjected to the flame and liable to damage as a result. Accordingly I have provided means for cooling them. The chains slide through the furnace on pipes, forming rails as before described, which are kept cool by circulating water through them. As the chains are in contact with the pipes a portion of the heat absorbed by the former will be conducted away by the latter, which results in keeping the temperature of the chains below the point at which damage might occur.

What I claim is:

1. A device of the character described comprising an oven, a conveyor having a flight therein for causing fruit or the like to be transported therethrough, and stationary means in said oven for acting upon said fruit to cause the latter to roll during its passage through the oven.

2. A device of the character described comprising a tunnel like oven, a conveyor having a flight therein for transporting fruit or the like therethrough and a curb in said oven extending alongside of said flight for engaging the fruit and causing the latter to be rolled during its passage through the oven.

3. A device of the character described comprising a tunnel like oven, a curb extending therethrough, an endless conveyor disposed alongside of said curb whereby fruit may rest on said conveyor and against said curb and be rolled while being transported therethrough.

4. A device of the character described comprising an oven, burners directing flame into said oven through the sides thereof, a parapet wall extending longitudinally of said oven, a pair of chains arranged to be moved through said oven, one chain being disposed on either side of said wall, and guide means in said oven for said chains, said guide means being adapted to be maintained at a temperature below that of said oven.

5. A device of the character described including an oven, there being openings in the sides thereof, burners directing flame into said oven through said openings, a parapet wall with a rounded top intermediate the sides and extending longitudinally of said oven, a pair of carrier chains disposed in said oven, one of said chains on each side of said wall, said chains being adapted to be moved through said oven in unison, guides in said oven for said chains and means to maintain said guides at a temperature below that of said oven.

6. A device of the character described including an oven, heating means for said oven, a parapet wall with a rounded top extending longitudinally of said oven, a carrier disposed at the side of said wall and arranged to be moved through said oven, said carrier having a rounded upper surface, the rounded surface being on substantially the same level as the top of said wall whereby substantially spheroidal fruit may be supported by said wall and said carrier.

7. A device of the character described including an oven, heating means for said oven, a parapet wall with a rounded top extending longitudinally of said oven, a carrier disposed at each side of said wall and arranged to be moved through said oven, said carriers having rounded upper surfaces the rounded surfaces being on substantially the same level as the top of said wall whereby substantially spheroidal fruit may be supported by said wall.

8. The combination of a conveyor having a flight for transporting fruit or the like, and a curb extending along the side of said flight for engaging the fruit and cause the latter to be rolled during its transit.

9. The combination of a longitudinally extending parapet wall with a rounded top, a carrier disposed at the sides of said wall, said carrier having a rounded upper surface, the rounded surface being on substantially the same level as the top of said wall whereby substantially spheroidal fruit may be supported by said wall and said carrier and rolled during its transit.

In witness that I claim the foregoing I have hereunto subscribed my name this 25 day of February, 1927.

AMOS IVAN ADDISON.